(12) United States Patent
Maffeis

(10) Patent No.: US 7,172,230 B2
(45) Date of Patent: Feb. 6, 2007

(54) ANGULAR PNEUMATIC GRIPPER

(75) Inventor: Giuseppe Maffeis, Via dell'Artigianato (IT)

(73) Assignee: Gimatic S.p.A (IT)

( * ) Notice: Subject to any disclaimer, the term of this patent is extended or adjusted under 35 U.S.C. 154(b) by 0 days.

(21) Appl. No.: 10/920,919

(22) Filed: Aug. 18, 2004

(65) Prior Publication Data
US 2005/0046212 A1 Mar. 3, 2005

(30) Foreign Application Priority Data
Aug. 29, 2003 (IT) .......................... BS 2003 A 77

(51) Int. Cl.
*B66C 1/00* (2006.01)
(52) U.S. Cl. ...................................... 294/88
(58) Field of Classification Search ................ 294/88, 294/115, 106, 57; 901/37; 269/32
See application file for complete search history.

(56) References Cited

U.S. PATENT DOCUMENTS

| 4,607,873 | A | * | 8/1986 | Nusbaumer et al. .......... 294/88 |
| 4,667,998 | A | * | 5/1987 | Borcea et al. ................. 294/88 |
| 4,892,344 | A | * | 1/1990 | Takada et al. ................. 294/88 |
| 5,639,136 | A | * | 6/1997 | Rosengren et al. ...... 294/86.41 |
| 5,904,358 | A | * | 5/1999 | Hosono et al. ............. 279/115 |
| 6,428,070 | B1 | * | 8/2002 | Takanashi et al. ............ 294/88 |
| 6,530,615 | B2 | * | 3/2003 | Filipiak et al. ................ 294/88 |
| 6,575,512 | B2 | * | 6/2003 | Moilanen et al. ............. 294/88 |

* cited by examiner

*Primary Examiner*—Gene O. Crawford
*Assistant Examiner*—Esther Onyinyechi Okezie
(74) *Attorney, Agent, or Firm*—McGlew & Tuttle, PC

(57) ABSTRACT

The invention concerns a pneumatic angular gripper which includes a gripper body forming a chamber (14), a piston (12) moving alternately in said chamber, and a pair of gripper jaws (13) oscillating in opposite directions on respective rotation axes in said gripper body. Each jaw (13) is connected to the head of one piston stem (12) by means of a connecting rod (22) forming a longitudinal extension of the jaw and susceptible to angular movements in regards to the head of the stem of said piston. The connecting rod has a distal part guided and sliding in a base hole (21) formed in its respective jaw (13) and a proximal part fixed to a turning pin (23) placed on board the head of the piston stem.

3 Claims, 4 Drawing Sheets

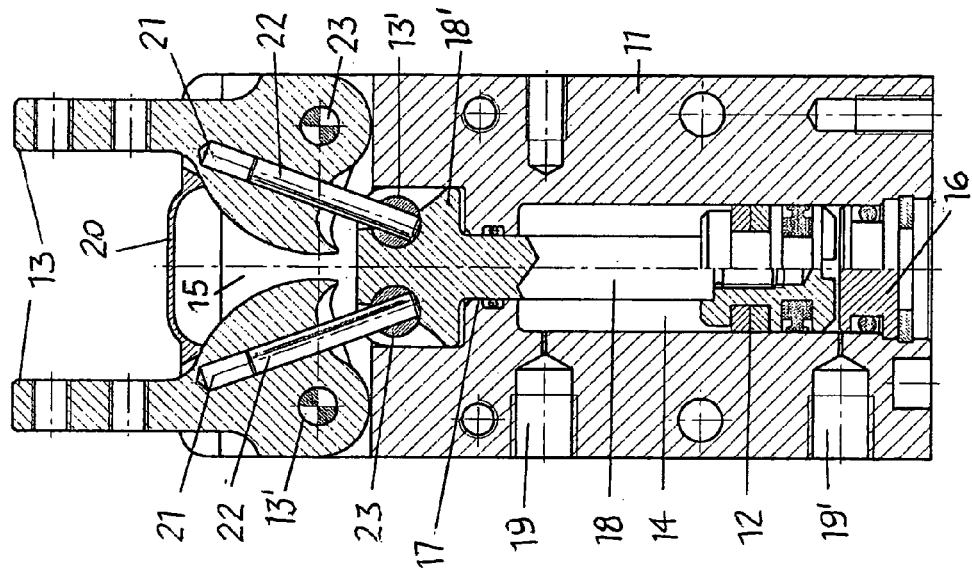
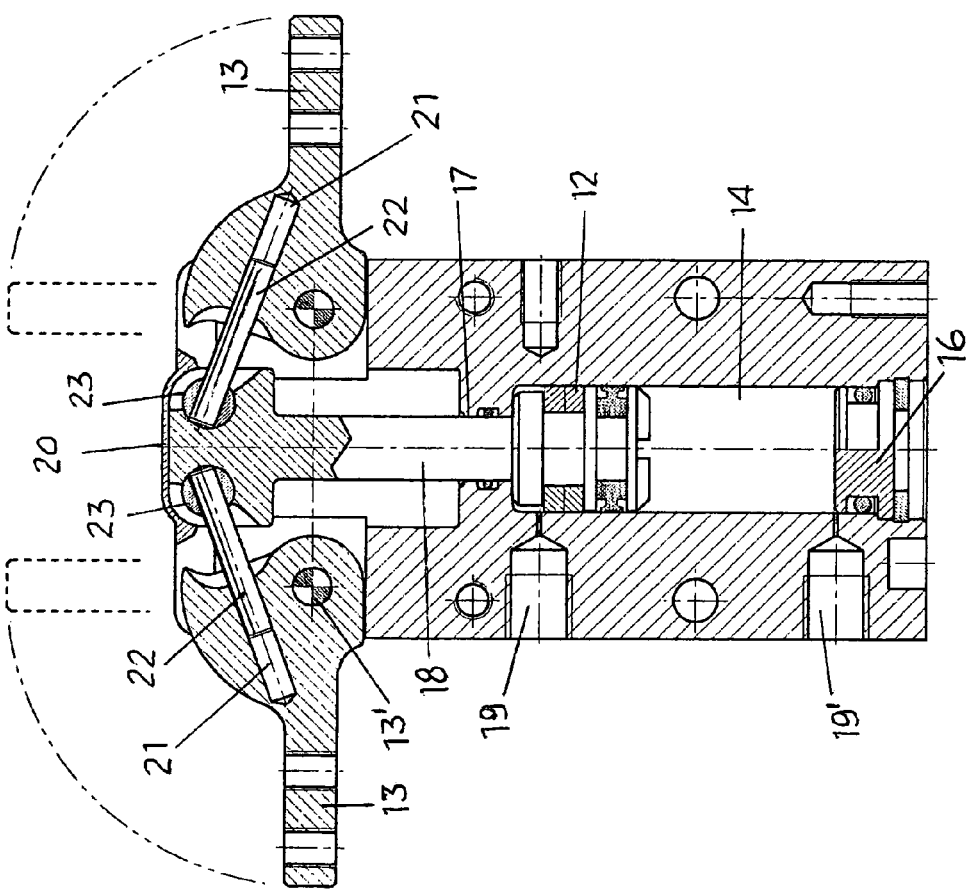
FIG. 6
FIG. 5

ANGULAR PNEUMATIC GRIPPER

FIELD OF THE INVENTION

This invention concerns in general the self centring devices for gripping items being machined and/or automatic handling, and refer in particular to a pneumatic gripper of the type with a pair of gripper jaws moving at an angle like levers in opposite directions to open and close by means of a single or double acting control piston.

STATE OF THE THECNIQUE

In the automatic items machining, handling and assembly fields, self-centring devices are well known and used, that is pneumatic grippers that include a gripper body enclosing a cylinder chamber, a piston positioned in and moving alternately in said chamber under the action of a fluid under pressure, and a couple of jaws pivoted to said body and oscillating in opposite directions on their respective rotation axes. There are means for connecting the piston to the jaws so that the linear movements of the piston are converted into angular actions of the jaws to open and close the latter.

According to a known embodiment, the control piston has a stem which extends in one direction passing between the gripper jaws, and each jaw is connected to the piston stem by means of an articulated plate which is pivoted, on one part, to the body and on the other, to the stem. This embodiment, however, has some faults in regards to assembly and precision in the control of the movements of the gripper jaws. In fact, any errors in dimensions of the components and the tolerances in the distances between the rotation axes of the jaws and the pins of the articulation plate, can markedly influence the precision and movement parallelism of the jaws when they move from the opening to the closing positions.

According to another embodiment, corresponding for example to the U.S. Pat. No. 5,904,358, an substantially T connecting element is fixed axially to a control piston; each jaw has, distant from its rotation axis, a guide slot; and the connecting element holds two rollers or drive pins on two opposite parts that engage and slide in the slots of the jaws to cause the angular movements of the latter in opposite directions in answer to the linear movements of the piston.

In this other implementation, the rollers or drive pins are essentially parallel to the rotation axes of the jaws and obliged to slide in guide slots in a condition that implies heightened wear on the joined parts. Furthermore, the control torque transmitted by the piston to the jaws varies during rotation, given that the lever arm between the rotation axis of each jaw and the respective drive roller varies with the angulations of the jaw during the passage from its opening position to its closing position and vice versa.

OBJECTS AND SUMMARY OF THE INVENTION

One object of this invention is to avoid the above mentioned disadvantages and drawbacks of the pneumatic angular gripper using the known technique, thanks to a new and original joining of the gripper jaws to the control piston stem, carried out by means that essentially represent an extension of the jaws in a longitudinal direction towards the stem of the piston with the advantage of an increase of the force of the transmission arm from the piston of the jaws.

Another object of the invention is to supply an improved pneumatic gripper in which a new, original connection between the gripper jaws and the control piston gives the system a longer life and optimises the transmission conditions of the work torque from the piston to the jaws.

One advantage is that under the same displacement conditions, a considerable increase in the closing force of the jaws can be witnessed in the gripper of the invention compared to the jaws known up to now.

These objects and advantages are achieved with an angular pneumatic gripper improved according to the preface of claim 1 and thus characterised in that each gripper jaw is connected to the head of the control piston stem by means of a connecting rod which forms a longitudinal extension of the jaw and is susceptible to angular movements with respect to the head of the piton stem it is connected to.

BRIEF DESCRIPTION OF DRAWINGS

This invention will however be illustrated more in detail in the description that follows made with reference to the attached drawings, which are indicative and not limiting, in which:

FIG. 5 is a section view along the axis of the gripper with the jaws in the open position;

FIG. 6 is a similar cutaway view of the gripper along the axis with the jaws in the closed position;

DETAILED DESCRIPTION OF THE INVENTION

Figures 1, 2:
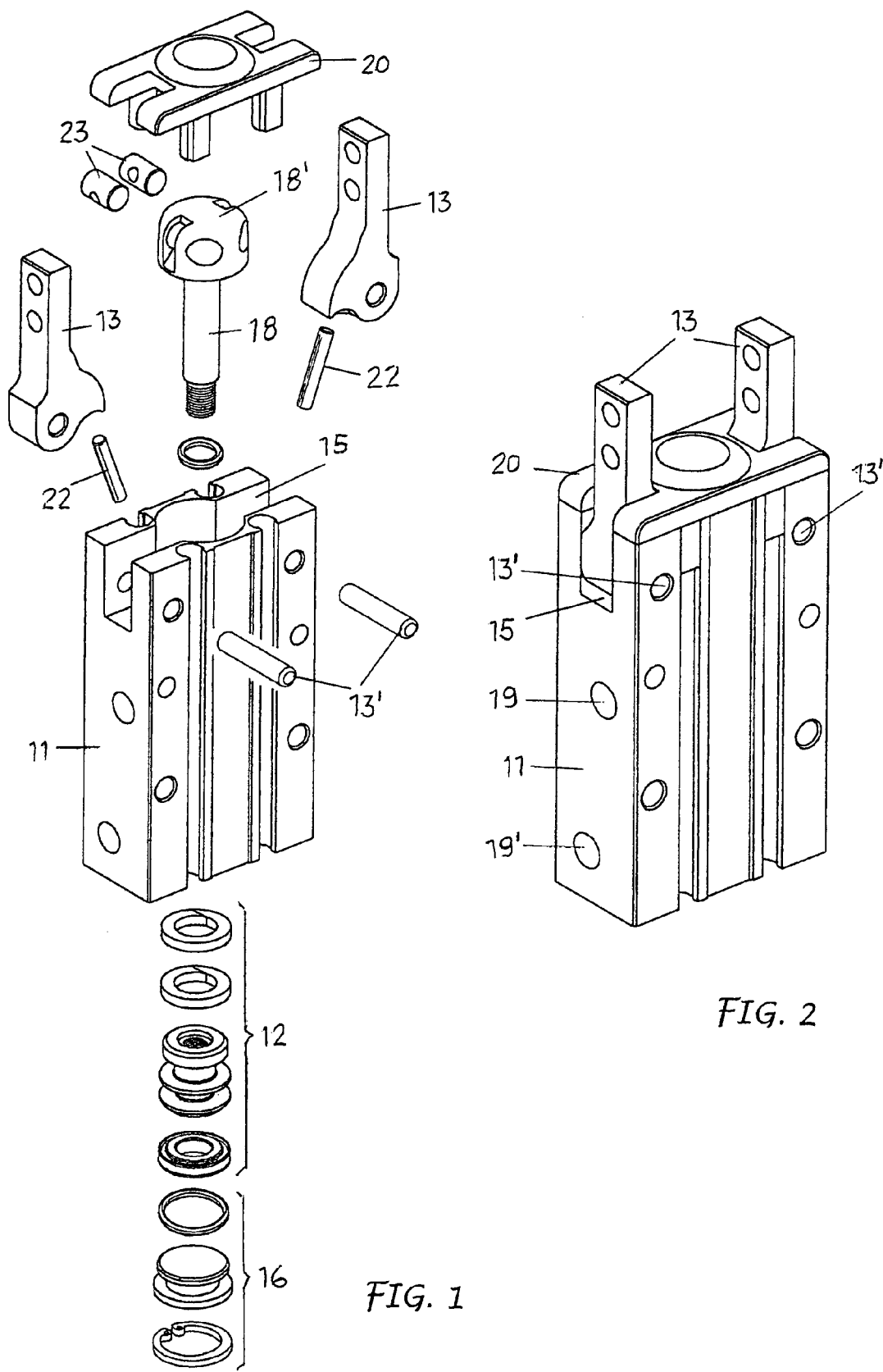
FIG. 1 is an exploded view of the components of the pneumatic gripper according to the invention.
FIG. 2 is a view in perspective of the assembled gripper.
Figure 3:
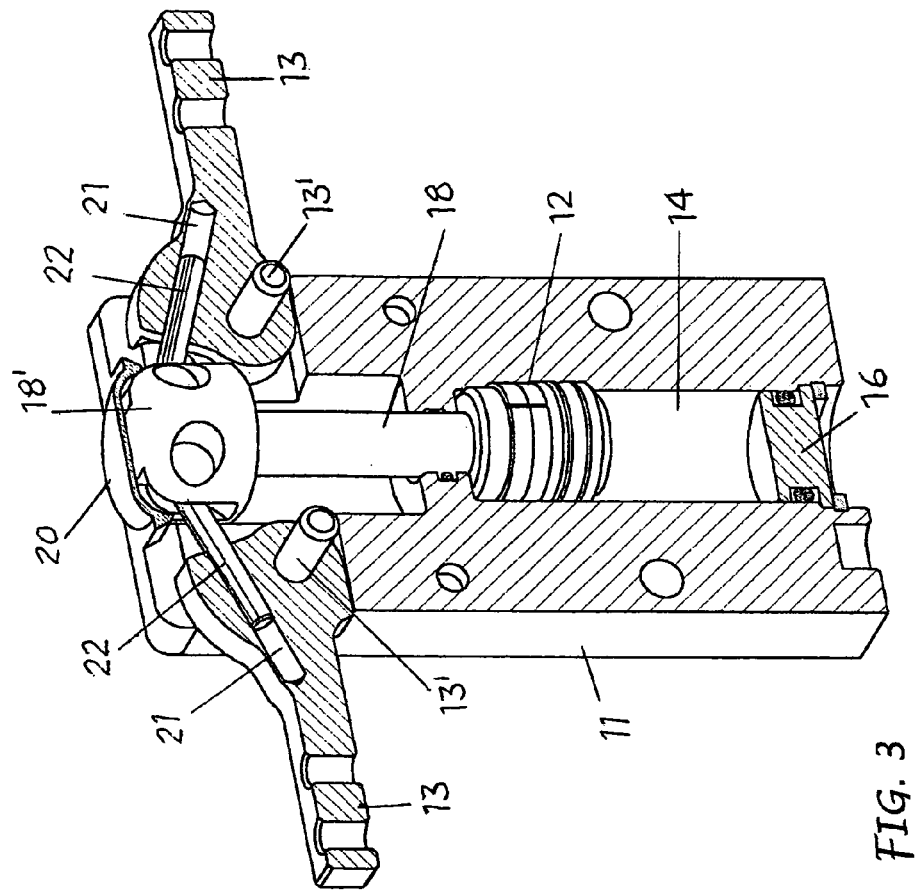
FIG. 3 is an asymmetric cross section of the gripper with the jaws in the open position.
Figure 4:
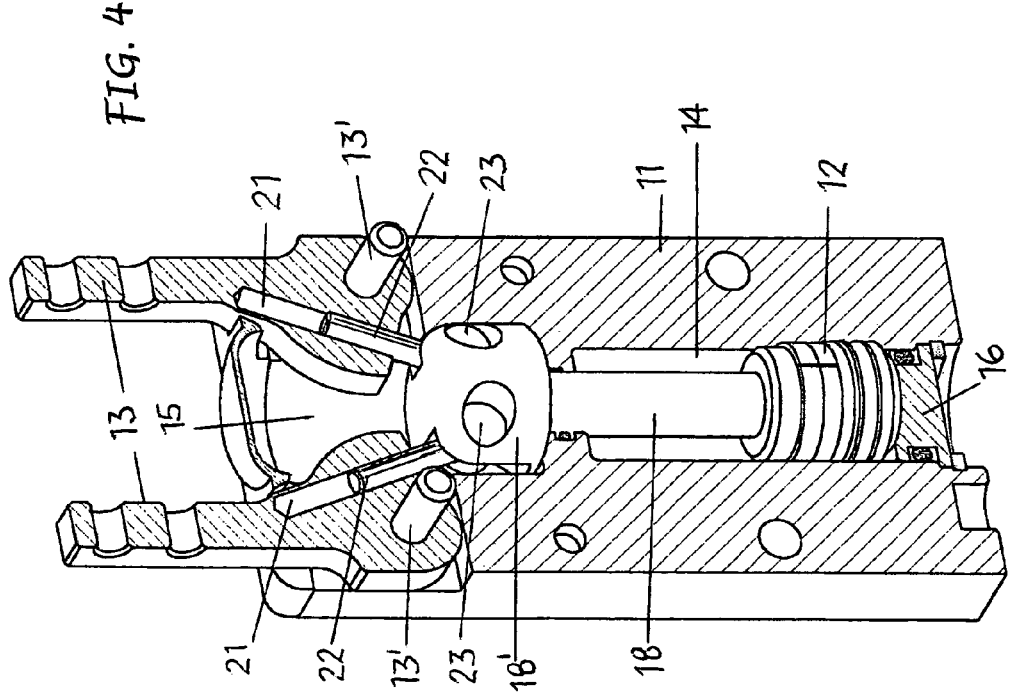
FIG. 4 is a similar view as the one in FIG. 3, but with the jaws in the closed position.
Figure 7:
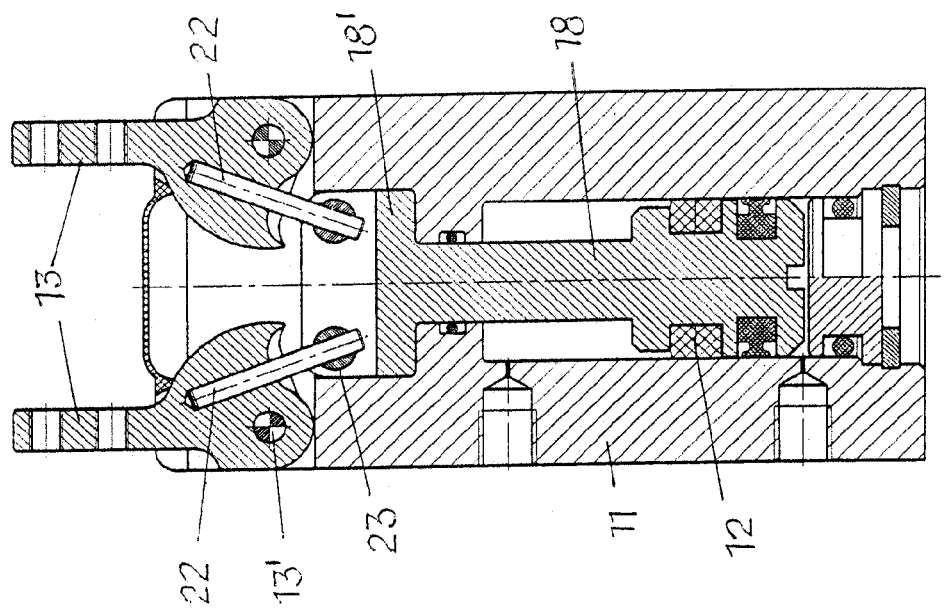
FIG. 7 is a section view along the axis of the gripper showing the jaws in the open position with the distal end of the connecting rod fixed to the jaw with the proximal end of the same rod guided and sliding in the pin which is carried by the head of the piston stem.
Figure 8:
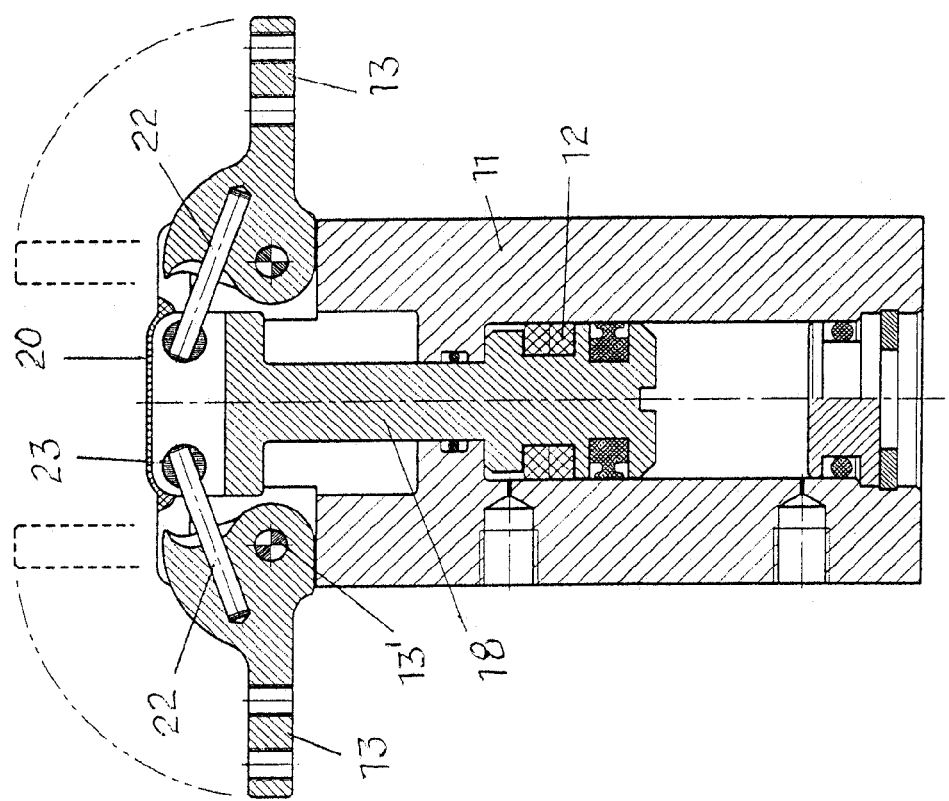
FIG. 8 is a similar section view as the one in FIG. 7, but with the jaws in the closed position.

As represented, the gripper includes a gripper body 11, a control piston 12 and a couple of gripper jaws 13.

The gripper body 11 in one part forms a cylinder chamber 14 and the other part, a recess 15. At one of its ends, the chamber 14 is closed by a cover 16, whereas the opposite end opens towards the recess 15 through an intermediate hole 17.

The control piston 12 is housed and slides in the chamber 14 and is equipped with a stem 18 which passes through a seal into the intermediate hole 17 and terminates with a head 18' on a level with the recess 15. The piston can be single acting or, as shown in the drawings, double acting. In the second case and as shown in FIGS. 5 and 6, there are two entrance/exit ports 19, 19' at the ends of the chamber 14 of a fluid under pressure from opposite sides of the piston for the alternative movements of the latter.

The gripper jaws 13 are assembled symmetrically in the recess 15 of the gripper body from opposite sides of the head 18' of the stem 18 of the piston 12, and can be equipped with interchangeable jaws—not shown—depending on the item to be handled. A part of the recess 15 lying between the jaws 13 is closed by a protective cover 20 attached to the body 11.

The jaws 13 are mounted on respective rotation axes 13' supported by the gripper body 11 at the sides of the recess 15 and are susceptible to angular movements of about 90° between an open and a closed position. Because of these movements of theirs, both the jaws are connected and controlled by the piston 12.

According to the invention, in one of its sections facing towards the head 18' of the stem 18 of the piston, each jaw 13 is provided with a base hole 21 which extends along a plane substantially perpendicular to the rotation axis 13' up to a certain distance from it. In the base hole 21 is located a distal part of a connecting rod 22, the proximal part of which is radially associated with a pin 23, positioned and turning on board the head 18' of the stem 18 of the piston 12, parallel to the rotation axis 13' of the respective jaw 13.

In the example given in the drawings, the distal part of the connecting rod 22 is guided and sliding in the base hole 21 of the jaw 13, whereas its proximal end is attached to its respective turning pin 23. The same result is however reached, even though not shown, if the distal end of the connecting rod 22 is fixed in the hole 21 of the jaw 13, whereas its proximal end is guided and slides crossways in regards to the pin 21 and possibly in a coincident hole machined in the head of the piston stem.

Anyway, the connecting rods 22 form an extension in length of the gripper jaws 13 and act as a lever arm for direct and regular transmission of the control force from the piston to the jaws and at the same time, thanks to the rotation of the pins 23, for the conversion of the rectilinear movements of the piston into angular opening and closing movements of the jaws.

The invention claimed is:

1. Pneumatic angular gripper including a gripper body forming a cylinder chamber and a recess in communication with each other by means of an intermediate hole, a control piston positioned and movable alternatively in said chamber under the action of a fluid under pressure and having a piston stem which passes in said intermediate hole and terminates in a head on a level with said recess, and a pair of jaws supported on respective rotation axes in said recess and turning in opposite directions between an opening and closing position in response to alternative movements of the piston in said chamber, each said jaw being connected to the head of the control piston stem by means of a connecting rod forming a longitudinal extension of the jaw and susceptible to angular movements in regards to the head of the stem of said piston, each jaw in one of its parts facing the head of the piston stem, is equipped with a base hole which extends along a first plane substantially perpendicular to a second plane comprising the rotation axis of the jaw said first plane is at a distance from the rotation axis, and in which said connecting rod has a distal part housed in said base hole and a proximal part radially associated with a pin placed in the head of the piston stem, said pin turning and being parallel to the rotation axis of the jaw, wherein the distal part of the connecting rod is fixed in the base hole of the jaw, and the proximal part of said connecting rod is guided and slides crossways at least in the respective turning pin on board the head of the piston stem.

2. Pneumatic angular gripper including a gripper body forming a cylinder chamber and a recess in communication with each other by means of an intermediate hole, a control piston positioned and movable alternatively in said chamber under the action of a fluid under pressure and having a piston stem which passes in said intermediate hole and terminates in a head on a level with said recess, and a pair of jaws supported on respective rotation axes in said recess and turning in opposite directions between an opening and closing position in response to alternative movements of the piston in said chamber, each said jaw being connected to the head of the control piston stem by means of a connecting rod forming a longitudinal extension of the jaw and susceptible to angular movements in regards to the head of the stem of said piston, each jaw in one of its parts facing the head of the piston stem, is equipped with a base hole, and in which the distal part of said connecting rod is fixed in the base hole of the jaw, and the proximal part of said connecting rod is guided and slides crossways at least in a respective turning pin on board the head of the piston stem, said turning pin being parallel to the rotation axis of the jaw.

3. A pneumatic angular gripper comprising:
   a gripper body defining a cylinder chamber, a recess, and an intermediate hole in communication with said cylindrical chamber and said recess;
   a control piston movably arranged in said chamber under an action of a fluid under pressure, said control piston having a piston stem arranged in said intermediate hole, said control piston having a head arranged in said recess and connected to said piston stem;
   a pair of jaws arranged in said recess, said jaws being rotatable on respective rotation axes in said recess, said jaws rotating in opposite directions between an opening and closing position in response to alternative movements of said piston in said chamber, each of said jaws defining a base hole;
   a connecting rod for each said jaw connecting said each jaw to said head of said control piston, each said connecting rod forming a longitudinal extension of a respective said jaw, one end of each said connecting rod being guided and sliding in said base hole of a respective said jaw; and
   a pair of turning pins pivotally mounted in said head, another end of said each connecting rod being connected to said turning pins and pivoting with said turning pins in said head of said control piston, wherein the distal part of the connecting rod is fixed in the base hole of the jaw, and the proximal part of said connecting rod is guided and slides crossways at least in the respective turning pin on board the head of the piston stem.

* * * * *